(12) United States Patent
Yamada et al.

(10) Patent No.: US 11,752,487 B2
(45) Date of Patent: Sep. 12, 2023

(54) PENTASIL-TYPE ZEOLITE AND PRODUCTION METHOD THEREFOR

(71) Applicant: TOSOH CORPORATION, Yamaguchi (JP)

(72) Inventors: Hidenori Yamada, Yamaguchi (JP); Hiroshi Okaniwa, Yamaguchi (JP); Satoshi Yoshida, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 374 days.

(21) Appl. No.: 17/287,333

(22) PCT Filed: Oct. 18, 2019

(86) PCT No.: PCT/JP2019/041115
§ 371 (c)(1),
(2) Date: Apr. 21, 2021

(87) PCT Pub. No.: WO2020/085237
PCT Pub. Date: Apr. 30, 2020

(65) Prior Publication Data
US 2021/0354117 A1    Nov. 18, 2021

(30) Foreign Application Priority Data

Oct. 25, 2018 (JP) ................................ 2018-200724
Jul. 19, 2019 (JP) ................................ 2019-133651

(51) Int. Cl.
| | | |
|---|---|---|
| *B01J 29/18* | (2006.01) | |
| *B01J 20/18* | (2006.01) | |
| *B01J 6/00* | (2006.01) | |
| *B01J 20/28* | (2006.01) | |
| *C01B 39/36* | (2006.01) | |

(52) U.S. Cl.
CPC .............. *B01J 20/186* (2013.01); *B01J 6/001* (2013.01); *B01J 20/28004* (2013.01); *B01J 20/28061* (2013.01); *C01B 39/36* (2013.01); *C01P 2006/12* (2013.01)

(58) Field of Classification Search
CPC .... B01J 6/001; B01J 20/186; B01J 20/28004; B01J 20/28061; B01J 29/40; B01J 35/1019; B01J 37/082; B01J 37/02; B01J 37/023; B01J 37/30; C01P 2006/12; C01B 39/40; C01B 39/36

USPC .................... 502/60, 77, 400, 407, 502, 526
See application file for complete search history.

(56) References Cited

U.S. PATENT DOCUMENTS

| | | |
|---|---|---|
| 5,116,792 A | 5/1992 | Ward |
| 2007/0135637 A1 | 6/2007 | Bosch et al. |
| 2015/0182940 A1 | 7/2015 | Lively et al. |
| 2016/0250624 A1 | 9/2016 | Parvulescu et al. |

FOREIGN PATENT DOCUMENTS

| | | |
|---|---|---|
| CN | 1072654 A | 6/1993 |
| CN | 1105906 | 8/1995 |
| CN | 101722022 | 6/2010 |
| CN | 104148010 | 11/2014 |
| JP | 5-124811 A | 5/1993 |
| JP | 9-295812 A | 11/1997 |
| JP | 2007-533580 A | 11/2007 |
| JP | 2016-535718 A | 11/2016 |
| WO | 00/037398 | 6/2000 |
| WO | 2005/053842 A1 | 6/2005 |
| WO | 2015/059171 A1 | 4/2015 |

OTHER PUBLICATIONS

Extended European Search Report issued in Europe Patent Application No. 19876689.1 dated Jul. 18, 2022.
Chon, H. et al., "Progress in Zeolite and Microporous Materials", Studies in Surface Science and Catalysis, vol. 105, 1997, pp. 309.
International Search Report issued in International Patent Application No. PCT/JP2019/041115, dated Jan. 7, 2020, along with English Translation thereof.
International Preliminary Report on Patentability issued in International Patent Application No. PCT/JP2019/041115, dated Apr. 27, 2021, along with English Translation thereof.

*Primary Examiner* — Elizabeth D Wood
(74) *Attorney, Agent, or Firm* — GREENBLUM & BERNSTEIN, P.L.C.

(57) ABSTRACT

Provided are a pentasil-type zeolite that is less likely to adsorb water compared to conventional zeolites and has excellent strength when used as a molded body, and a method for producing the pentasil-type zeolite.

A pentasil-type zeolite having a water adsorption amount of 4.0 g/100 g-zeolite or less under the conditions of 25° C. and a relative humidity of 90% and having a major axis diameter of primary particles of from 0.2 μm to 4.0 μm, and a method for producing the pentasil-type zeolite.

9 Claims, 5 Drawing Sheets

PENTASIL-TYPE ZEOLITE AND PRODUCTION METHOD THEREFOR

TECHNICAL FIELD

The present invention relates to a pentasil-type zeolite and a method for producing the same. More particularly, the invention relates to a pentasil-type zeolite which has a small water adsorption amount and is appropriate for use applications where high hydrophobicity is required, such as VOC adsorbents, and which has excellent strength when used as a molded body, and to a method for producing the pentasil-type zeolite.

BACKGROUND ART

Pentasil-type zeolites are widely utilized as adsorbents and catalysts. When a zeolite is used as a VOC adsorbent, it is preferable that the zeolite is less likely to adsorb water. It is because when the zeolite is less likely to adsorb water, the selectivity for VOC adsorption is enhanced.

When a zeolite is used as an adsorbent or a catalyst, the zeolite is generally processed into a molded body and is utilized in an adsorption column or a reactor with a stationary phase or a fluidized bed. When the molded body is powdered during packing, adsorption and desorption, or a catalytic reaction, the powder causes facility-related problems or pressure loss, and therefore, the molded body is required to have high strength. The strength of such a molded body is affected by the size of primary particles of the raw material zeolite powder.

In Non Patent Literature 1, a pentasil-type zeolite crystallized in the presence of fluorine is reported. A pentasil-type zeolite crystallized in the presence of fluorine becomes less likely to adsorb water; however, the primary particles are very large, such as 5 to 100 μm. When the primary particles are as large as 5 to 100 μm, the strength at the time of processing the pentasil-type zeolite into a molded body is lowered. Furthermore, regarding crystallization using highly corrosive fluorine, it is difficult to use conventional zeolite production facilities.

CITATION LIST

Non Patent Literature

Non Patent Literature 1: Studies in Surface Science and Catalysis, Vol. 105, p. 309 (1997)

SUMMARY OF INVENTION

Technical Problem

An object of the present invention is to provide a pentasil-type zeolite that is less likely to adsorb water and has excellent strength when used as a molded body, and a method for producing the pentasil-type zeolite.

Solution to Problem

Under such circumstances as described above, the inventors of the present invention repeatedly conducted a thorough investigation on pentasil-type zeolite and production conditions therefor, and as a result, the inventors finally found the pentasil-type zeolite of the present invention and a method for producing the same.

That is, the present invention resides in the following items [1] to [9].

[1] A pentasil-type zeolite having a water adsorption amount of 4.0 g/100 g-zeolite or less under the conditions of 25° C. and a relative humidity of 90% and having a major axis diameter of primary particles of from 0.2 μm to 4.0 μm.

[2] The pentasil-type zeolite according to the above-described item [1], wherein the pentasil-type zeolite has an aspect ratio of primary particles of from 1.0 to 3.0.

[3] The pentasil-type zeolite according to the above-described item [1] or [2], wherein the pentasil-type zeolite has a ratio $SiO_2/Al_2O_3$ (molar ratio) of 200 or higher.

[4] The pentasil-type zeolite according to any one of the above-described items [1] to [3], wherein the pentasil-type zeolite has a BET specific surface area of 300 $m^2/g$ or larger.

[5] The pentasil-type zeolite according to any one of the above-described items [1] to [4], wherein the pentasil-type zeolite has a content of $Na_2O$ of 1.00 percent by weight or less.

[6] A method for producing the pentasil-type zeolite according to any one of the above-described items [1] to [5], including:
a crystallization step of crystallizing a mixture including a silicon source, an amine as a structure-directing agent, and an alkali source, the mixture including no fluorine source;
a step of bringing a zeolite into contact with an alkali solution at pH 10 to 14; and
a step of calcining the zeolite at a temperature of 500° C. to 1000° C. under a flow of water vapor.

[7] The method for producing the pentasil-type zeolite according to the above-described item [6], wherein the amine is n-propylamine, dipropylamine, or tripropylamine.

[8] The method for producing the pentasil-type zeolite according to the above-described [6] or [7], wherein the crystallization temperature is 160° C. or lower.

[9] The method for producing the pentasil-type zeolite according to any one of the above-described items [6] to [8], wherein the mixture has the following molar composition:

| | |
|---|---|
| Structure-directing agent/$SiO_2$ | from 0.04 to 0.5 |
| $OH^-/SiO_2$ | from 0.08 to 0.2 |

Advantageous Effects of Invention

The present invention provides a pentasil-type zeolite that is less likely to adsorb water compared to conventional zeolites and has excellent strength when used as a molded body, and a method for producing the pentasil-type zeolite.

DESCRIPTION OF EMBODIMENTS

Hereinafter, a pentasil-type zeolite of the present invention will be described.

The present invention relates to a pentasil-type zeolite. A pentasil-type zeolite is a zeolite containing a combination of 5-membered oxygen rings. Examples of the pentasil-type zeolite include at least one selected from the group consisting of MFI and MEL according to the structural code defined by the International Zeolite Association (hereinafter, referred to as "IZA"), and intergrowth bodies thereof. Examples of MFI include ZSM-5 and silicalite-1, and examples of MEL include ZSM-11 and silicalite-2.

The crystal phase of the pentasil-type zeolite can be identified by making comparisons with at least any one of the powder X-ray diffraction (hereinafter, referred to as "XRD") patterns described in Collection of simulated XRD powder patterns for zeolites, Fifth revised edition, p. 483 (2007), or the XRD patterns described in The Pentasil Family of Disorder in Zeolite Frameworks in the webpage of the IZA Structure Commission (http://wwwiza-structure.org/databases/).

With regard to the pentasil-type zeolite of the present invention, the water adsorption amount under the conditions of 25° C. and a relative humidity of 90% is 4.0 g/100 g-zeolite or less. When the water adsorption amount under the conditions of 25° C. and a relative humidity of 90% is larger than 4.0 g/100 g-zeolite, the selectivity for VOC adsorption is decreased, which is inappropriate. As the water adsorption amount is small even in a high-humidity environment with a relative humidity of 90%, the zeolite is less likely to adsorb water even in a case where it is used as a VOC adsorbent in a high-humidity season or in a high-humidity region. Therefore, when the pentasil-type zeolite of the present invention is used as a VOC adsorbent, the selectivity for VOC adsorption is enhanced. It is more preferable that the water adsorption amount under the conditions of 25° C. and a relative humidity of 90% is smaller. The water adsorption amount under the conditions of 25° C. and a relative humidity of 90% is preferably 3.5 g/100 g-zeolite or less, more preferably 3.0 g/100 g-zeolite or less, and even more preferably 2.5 g/100 g-zeolite or less.

With regard to the pentasil-type zeolite of the present invention, the major axis diameter of primary particles is from 0.2 µm to 4.0 µm. When the major axis diameter of the primary particles is smaller than 0.2 µm, it is inappropriate because filtering and washing is difficult, and when the major axis diameter is larger than 4.0 µm, it is inappropriate because the strength as a molded body is low and the surface area is small. The major axis diameter of the primary particles is preferably from 0.2 µm to 3.5 µm, more preferably from 0.2 µm to 3.0 µm, even more preferably from 0.2 µm to 2.5 µm, and particularly preferably from 0.4 µm to 2.5 µm, from 0.4 µm to 2.0 µm, from 0.6 µm to 2.0 µm, and from 0.6 µm to 1.5 µm.

Measurement of the major axis diameter of the primary particles of the pentasil-type zeolite of the present invention is carried out using an electron microscope. The electron microscope may be any electron microscope capable of obtaining particle images required for the measurement, and generally, a scanning electron microscope (hereinafter, referred to as "SEM") may be used. The method for measuring the major axis diameter of the primary particles is as described in <Morphological observation of primary particles> in Examples.

The relationship between the major axis diameter of primary particles (particle size) and the molded body strength is represented by the following Rumpf formula.

$$\sigma = 1.1 \times (1-\varepsilon) \times F_{ad}/(\varepsilon \times D_p^2)$$

σ: Force required for breakage, ε: porosity, $F_{ad}$: interparticle force, $D_p$: particle size As is obvious from the Rumpf formula, when $D_p$ becomes smaller, σ becomes larger. That is, when the particle size is smaller, the strength as a molded body is higher.

With regard to the pentasil-type zeolite of the present invention, it is preferable that the aspect ratio of the primary particles is from 1.0 to 3.0. It is obvious from the definition that the aspect ratio of the primary particles is never less than 1.0. It is preferable as the aspect ratio of the primary particles is smaller since the particle packing properties become superior. As a result, the strength as a molded body becomes higher. The effect exerted by particle shape on the particle packing properties is disclosed in page 20, line 1 to page 22, line 5 of document "Operation and Simulation of Powder Bed, edited by the Society of Powder Technology, Japan". With regard to the effect exerted by particle shape on the particle packing properties, particles that have a spherical shape or a shape slightly distorted from a spherical shape and have a small aspect ratio, have superior particle packing properties than particles that do not have a spherical shape and have a large aspect ratio, such as fragment particles. That is, according to the present invention, it is preferable that the aspect ratio of the primary particles is smaller. The aspect ratio of the primary particles is more preferably from 1.0 to 2.5, even more preferably from 1.0 to 2.3, and particularly preferably from 1.0 to 2.1, from 1.0 to 1.9, from 1.0 to 1.7, from 1.0 to 1.5, or from 1.0 to 1.4.

With regard to the pentasil-type zeolite of the present invention, the shape of the primary particles is an angular shape. Here, the term angular shape refers to primary particles having sharp corners in the morphological observation of primary particles using an electron microscope, and examples include a rectangular parallelepiped shape, an approximately rectangular parallelepiped shape, a cubic shape, and an approximately cubic shape. On the other hand, primary particles having a spherical shape, an approximately spherical shape, or an elliptical shape are round in shape and do not have sharp corners in the morphological observation of primary particles using an electron microscope, and those primary particles are different from the present invention.

With regard to the pentasil-type zeolite of the present invention, it is preferable that the ratio $SiO_2/Al_2O_3$ (molar ratio; hereinafter, the same) is 200 or higher. As the ratio $SiO_2/Al_2O_3$ is higher, hydrophobicity is increased, and zeolite is less likely to adsorb water. Therefore, when the pentasil-type zeolite of the present invention is used as a VOC adsorbent or the like, the selectivity for VOC adsorption is enhanced. The ratio $SiO_2/Al_2O_3$ is more preferably 400 or higher, even more preferably 800 or higher, and particularly preferably 1500 or higher.

With regard to the pentasil-type zeolite of the present invention, it is preferable that the BET specific surface area is 300 $m^2/g$ or larger. It is more preferable as the BET specific surface area is larger since the adsorption amount increases when the pentasil-type zeolite is used as an adsorbent, while the activity or lifetime is enhanced when the pentasil-type zeolite is used as a catalyst. The BET specific surface area is more preferably 330 $m^2/g$ or larger, and even more preferably 350 $m^2/g$ or larger.

When the pentasil-type zeolite of the present invention is used as an adsorbent or a catalyst, since corrosion in the apparatuses, piping, and the like caused by sodium is less likely to occur, it is preferable that the content of $Na_2O$ is 1.00 percent by weight or less. The content of $Na_2O$ is more preferably 0.80 percent by weight or less, even more preferably 0.60 percent by weight or less, and particularly preferably 0.40 percent by weight or less. Furthermore, the content of $Na_2O$ may be 0.05 percent by weight or more or 0.10 percent by weight or more.

The pentasil-type zeolite of the present invention can be used as an adsorbent or a catalyst. Particularly, it is suitable to use the pentasil-type zeolite of the present invention as a VOC adsorbent. When a zeolite is used as a VOC adsorbent, it is preferable that the zeolite is less likely to adsorb water. It is because, as the zeolite is less likely to adsorb water, the selectivity for VOC adsorption is enhanced. Since the pentasil-type zeolite of the present invention is less likely to adsorb water, it is particularly suitable to use the pentasil-type zeolite as a VOC adsorbent. Furthermore, when a zeolite is used as an adsorbent or a catalyst, generally, the zeolite is processed into a molded body and is utilized in an adsorption column or a reactor with a stationary phase or a fluidized bed. When the molded body is powdered during packing, adsorption and desorption, or a catalytic reaction, the powder causes facility-related problems or pressure loss, and therefore, the molded body is required to have high strength. The pentasil-type zeolite of the present invention is excellent in terms of strength such as abrasion-resistant strength or crushing strength when processed into a molded body.

Next, a method for producing the pentasil-type zeolite of the present invention will be described.

The pentasil-type zeolite of the present invention can be produced by a production method having a crystallization step of crystallizing a mixture that includes a silicon source, an amine as a structure-directing agent, and an alkali source but does not include a fluorine source; a step of bringing a zeolite into contact with an alkali solution at pH 10 to 14; and a step of calcining the zeolite at a temperature of 500° C. to 1000° C. under a flow of water vapor.

The mixture used in the crystallization step includes a silicon source, an amine as a structure-directing agent, and an alkali source.

The silicon source is a compound containing silicon (Si), and for example, at least one selected from the group consisting of tetraethoxysilane, silica sol, fumed silica, precipitated silica, sodium silicate, and amorphous silicic acid may be used. From the viewpoint of being appropriate for industrial production, it is preferable that the silicon source is at least one selected from the group consisting of silica sol, fumed silica, precipitated silica, sodium silicate, and amorphous silicic acid.

The structure-directing agent of the pentasil-type zeolite is disclosed in document "Zeolites, Vol. 3, p. 282 (1983)", and examples include amines such as n-propylamine, dipropylamine, tripropylamine, dibutylamine, dipropylenetriamine, dihexamethylenetriamine, triethylenetetramine, diethylenetriamine, ethanolamine, and propanolamine; quaternary ammonium cations such as tetrapropylammonium and tetraethylammonium; as well as glycerol, alcohols, and morpholine. In the present invention, among these structure-directing agents, an amine is used. By using an amine, the water adsorption amount at a relative humidity of 90% is likely to become smaller by carrying out the step of bringing a zeolite into contact with an alkali solution at pH 10 to 14 and the step of calcining the zeolite under a flow of water vapor. When a structure-directing agent other than an amine is used, even if the step of bringing a zeolite into contact with an alkali solution at pH 10 to 14 and the step of calcining the zeolite under a flow of water vapor are carried out, the water adsorption amount at a relative humidity of 90% is less likely to become small. Among the amines, n-propylamine, dipropylamine, and tripropylamine are preferred because the water adsorption amount at a relative humidity of 90% is more likely to become smaller by carrying out the step of bringing a zeolite into contact with an alkali solution at pH 10 to 14 and the step of calcining the zeolite under a flow of water vapor.

In order to sufficiently obtain an effect as a structure-directing agent, the molar ratio of the structure-directing agent to silica in the mixture (hereinafter, referred to as "structure-directing agent/SiO$_2$") is preferably from 0.04 to 0.5. It prevents co-existence of an amorphous zeolite other than a pentasil structure, and it is economically efficient because the use amount of highly expensive raw materials can be reduced. The molar ratio is more preferably from 0.08 to 0.3.

The alkali source is a compound containing hydroxide anion (OH$^-$), and for example, at least one selected from the group consisting of a hydroxide containing an alkali metal and a tetraalkylammonium hydroxide may be mentioned as an example. In a case where the alkali source is a hydroxide containing an alkali metal, at least one selected from the group consisting of lithium hydroxide, sodium hydroxide, potassium hydroxide, rubidium hydroxide, and cesium hydroxide can be mentioned as an example. In a case where the alkali source is a tetraalkylammonium hydroxide, at least one selected from the group consisting of tetraethylammonium hydroxide, tetrapropylammonium hydroxide, and tetrabutylammonium hydroxide can be mentioned as an example.

Hydroxide anion (OH$^-$) functions as a mineralizer. In order to sufficiently obtain an effect as a mineralizer, the molar ratio of OH$^-$ to silica in the mixture (hereinafter, described as "OH$^-$/SiO$_2$") is preferably from 0.08 to 0.2, and more preferably from 0.09 to 0.18.

It is preferable that the composition of the mixture has at least the following molar composition.

| | |
|---|---|
| Structure-directing agent/SiO$_2$ | from 0.04 to 0.5 |
| OH$^-$/SiO$_2$ | from 0.08 to 0.2 |

Incidentally, the respective proportions in the above-described composition are molar (mol) proportions.

The following can be mentioned as a more preferred composition.

| | |
|---|---|
| Structure-directing agent/SiO$_2$ | from 0.08 to 0.3 |
| OH$^-$/SiO$_2$ | from 0.09 to 0.18 |

Furthermore, the mixture used in the crystallization step does not include a fluorine source.

A fluorine source refers to a compound raw material for hydrofluoric acid, ammonium fluoride, sodium fluoride, potassium fluoride, cesium fluoride, hydrosilicofluoric acid, ammonium silicofluoride, sodium silicofluoride, potassium silicofluoride, or cesium silicofluoride. Since the mixture does not include a fluorine source, the primary particles are not as large as 5 to 100 μm as in the cases of Non Patent Literatures 1 and 2, and the major axis diameter of the primary particles is 4.0 μm or less. Furthermore, in a case where the mixture contains fluorine, it is necessary to use corrosion-resistant materials for the production facilities; however, in the production method of the present invention, since fluorine is not used, crystallization can be carried out using conventional zeolite production facilities.

It is preferable that the mixture does not include fluorine, that is, the fluorine content is 0 ppm by weight. However, when the measurement error caused by conventional compositional analysis or the like is considered, the fluorine content of the mixture is less than or equal to the detection limit, and the content may be 100 ppm by weight or less, or 10 ppm by weight or less. When the mixture does not contain fluorine or a fluorine compound, production can be achieved using general-purpose facilities. The fluorine content of the mixture can be measured by general measurement methods such as XRF.

A pentasil-type zeolite is obtained by crystallizing a mixture having the above-described composition or the like in a hermetically sealed pressure vessel at any temperature of 80° C. to 200° C. for a sufficient time.

The crystallization temperature is not particularly limited. As the crystallization temperature is a low temperature, the BET specific surface area of the pentasil-type zeolite thus obtainable becomes large. Therefore, the crystallization temperature is preferably 160° C. or lower, more preferably 150° C. or lower, even more preferably 140° C. or lower, and particularly preferably 130° C. or lower.

In the step of bringing a zeolite into contact with an alkali solution at pH 10 to 14, removal of a hydrophilic amorphous portion that is present to a small extent in the zeolite is carried out. As a hydrophilic amorphous portion is removed, the zeolite becomes less likely to adsorb water.

The pH range of the alkali solution is 10 to 14. It is because when the pH is lower than 10, removal of the hydrophilic amorphous portion does not proceed sufficiently, and when the pH is higher than 14, the zeolite is dissolved therein. The pH of the alkali solution is preferably 11 to 13.5. The alkali solution is an aqueous solution of a compound containing hydroxide anion ($OH^-$), and for example, at least one selected from the group consisting of a hydroxide containing an alkali metal or a tetraalkylammonium hydroxide can be mentioned as an example. In a case where the alkali source is a hydroxide containing an alkali metal, at least one selected from the group consisting of lithium hydroxide, sodium hydroxide, potassium hydroxide, rubidium hydroxide, and cesium hydroxide can be mentioned as an example. In a case where the alkali source is a tetraalkylammonium hydroxide, at least one selected from the group consisting of tetraethylammonium hydroxide, tetrapropylammonium hydroxide, and tetrabutylammonium hydroxide can be mentioned as an example. The temperature for the step of bringing a zeolite into contact with an alkali solution is not particularly limited. In order for the removal of a hydrophilic amorphous portion to sufficiently proceed, the temperature is preferably 20° C. to 90° C., and more preferably 40° C. to 80° C. The contact time is not particularly limited. In order for the removal of a hydrophilic amorphous portion to sufficiently proceed, the contact time is preferably 0.2 to 10 hours, and more preferably 0.5 to 8 hours.

In the step of calcining zeolite at a temperature of 500° C. to 1000° C. under a flow of water vapor, since silanol in the zeolite is subjected to dehydration condensation, the zeolite is less likely to adsorb water. The temperature range is 500° C. to 1000° C. It is because when the temperature is lower than 500° C., dehydration condensation of silanol are less likely to proceed, and when the temperature is higher than 1000° C., the zeolite structure collapses. The calcination is preferably 600° C. to 1000° C., and more preferably 600° C. to 900° C. The phrase under a flow of water vapor means an atmosphere containing water vapor, and this is not particularly limited as long as it is an atmosphere containing water vapor, such as air containing water vapor, nitrogen containing water vapor, or an inert atmosphere such as argon. The calcination time is not particularly limited. The calcination time is preferably 0.5 to 10 hours, and more preferably 1 to 8 hours.

The production method of the present invention may have one or more of a washing step, a drying step, and a structure-directing agent removal step, after the crystallization step.

In the washing step, the pentasil-type zeolite obtained in the crystallization step is subjected to solid-liquid separation, and this is obtained as a solid phase. The washing method is optional, and the crystallization product may be washed with pure water.

After the washing step, in a case where alkali metals remain in the pentasil-type zeolite, the pentasil-type zeolite may be re-washed. Thereby, reduction or removal of the residual alkali metals can be achieved. Regarding the reduction of an alkali metal, for example, adjusting the amount of sodium to a content of 1.00 percent by weight or less in terms of $Na_2O$ may be mentioned as an example. Regarding a method of re-washing, mixing the pentasil-type zeolite after washing with at least one selected from the group consisting of water, an aqueous solution of ammonium chloride, dilute hydrochloric acid, dilute sulfuric acid, and dilute nitric acid may be mentioned. The pentasil-type zeolite after mixing may be washed by, for example, any method such as washing using pure water.

In the drying step, the pentasil-type zeolite is dried. The drying method may be, for example, treating at 100° C. to 200° C. in air.

In the structure-directing agent removal step, the structure-directing agent is removed. In the crystallization step, the pentasil-type zeolite is obtained in a state containing the structure-directing agent. From the pentasil-type zeolite containing such a structure-directing agent, the structure-directing agent can be appropriately removed. Regarding a method of removing the structure-directing agent, for example, calcination, decomposition, and washing can be mentioned. In a case where the structure-directing agent is removed by calcination, treating at 300° C. to 800° C., or further 400° C. to 700° C., for 0.5 to 12 hours under a flow of an oxygen-containing gas may be mentioned.

The production method of the present invention may have one or more of a washing step and a drying step after the step of bringing the zeolite into contact with an alkali solution at pH 10 to 14.

In the washing step, the pentasil-type zeolite obtained in the step of bringing the zeolite into contact with an alkali solution at pH 10 to 14 is subjected to solid-liquid separation, and this is obtained as a solid phase. The washing method is optional, and the crystallization product may be washed with pure water.

After the washing step, in a case where an alkali metal remains in the pentasil-type zeolite, the pentasil-type zeolite may be re-washed. Thereby, reduction or removal of the residual alkali metals can be achieved. Regarding the reduction of an alkali metal, for example, adjusting the amount of sodium to a content of 1.00 percent by weight or less in terms of $Na_2O$ may be mentioned as an example. Regarding a method of re-washing, mixing the pentasil-type zeolite after washing with at least one selected from the group consisting of water, an aqueous solution of ammonium chloride, dilute hydrochloric acid, dilute sulfuric acid, and dilute nitric acid may be mentioned. The pentasil-type zeolite after mixing may be washed by, for example, any method such as washing using pure water.

In the drying step, the pentasil-type zeolite is dried. The drying method may be, for example, treating at 100° C. to 200° C. in air.

EXAMPLES

Hereinafter, the present invention will be specifically described by way of Examples. However, the present invention is not limited to these Examples.

Incidentally, the various measurement methods in Examples and Comparative Examples are as follows.

<Identification of Crystal Structure>

XRD measurement of a sample was performed using an XRD apparatus (trade name: Ultima IV, manufactured by Rigaku Corporation). CuKα line (λ=1.5405 Å) was used as a radiation source, and the measurement range was 2θ=5° to 40°.

The sample was identified by comparing the XRD pattern thus obtained with the XRD pattern described in Collection of simulated XRD powder patterns for zeolites, Fifth revised edition, p. 483 (2007).

<Morphological Observation of Primary Particles>

Morphological observation of primary particles was carried out using an electron microscope (apparatus name: JSM-6390LV, manufactured by JEOL Ltd.).

Figure 1:
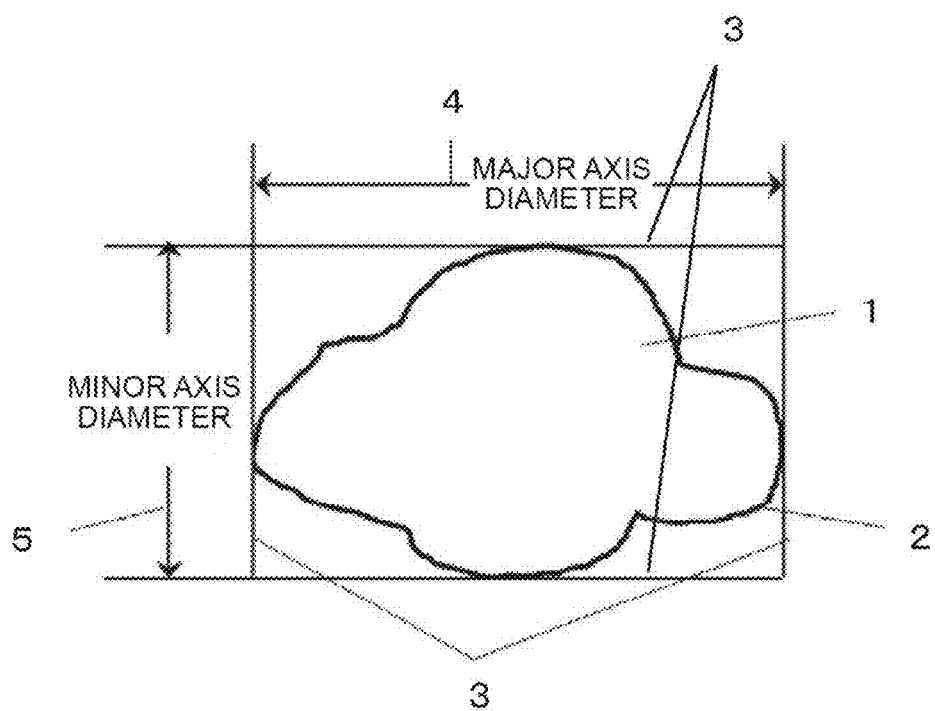
FIG. 1 is a schematic diagram illustrating a method of measuring the major axis diameter of the primary particle size.

The major axis diameter of primary particles is a value measured on the basis of the definition described in page 5, line 3 to page 6, line 2 of document "Particle size measurement technology, edited by the Society of Powder Technology, Japan". In the following description, the method of measuring the major axis diameter will be described by means of a schematic diagram (FIG. 1). One primary particle 1 left to stand on a flat surface is observed in a direction perpendicular to the flat surface. With regard to the contour 2 of a projected image of the primary particle 1, the smallest length among the lengths interposed between two parallel lines 3 that are in contact with this contour was designated as minor axis diameter 5 of the primary particle, and the length measured in a direction perpendicular to the minor axis diameter of the primary particle was designated as major axis diameter 4 of the primary particle. The major axis diameter of the primary particles was determined by randomly extracting thirty primary particles and calculating the average of the measured values of the major axis diameters of the individual primary particles. The aspect ratio of the primary particles was determined by dividing the major axis diameter of a primary particle by the minor axis diameter of the primary particle, and the aspect ratio was determined by randomly extracting thirty primary particles and calculating the average of the aspect ratios of the individual primary particles.

<Compositional Analysis>

A compositional analysis was carried out using a fluorescent X-ray apparatus (trade name: RIX2100, manufactured by Rigaku Corporation). As a pretreatment, a product was calcined at 600° C. for one hour. From the analysis results thus obtained, the $SiO_2/Al_2O_3$ ratio of the product and the content of $Na_2O$ were determined.

<BET Specific Surface Area>

The BET specific surface area of a sample was determined by measurement according to JIS 8830. For the measurement, a general specific surface area measuring apparatus (trade name: BELSORP-mini II, manufactured by MicrotracBEL Corp.) was used. As a pretreatment, a sample was maintained at 350° C. for 2 hours. For the sample after the pretreatment, the BET specific surface area was measured.

<Water Adsorption Amount>

For the measurement of the water adsorption amount, a vapor adsorption amount measuring apparatus (trade name: BELSORP-max, manufactured by MicrotracBEL Corp.) was used. The measurement was carried out at 25° C. As a pretreatment, a sample was maintained at 350° C. for 2 hours. For the sample after the pretreatment, measurement of the water adsorption amount was carried out, and the water adsorption amount per 100 g of zeolite at a relative humidity of 90% (hereinafter, referred to as "g/100 g-zeolite") was measured.

Example 1

An aqueous solution of sodium silicate and sulfuric acid were mixed, and particulate amorphous silicic acid was obtained. The particulate amorphous silicic acid thus obtained, n-propylamine (hereinafter, described as "NPA"), sodium hydroxide, and pure water were mixed, and a mixture having the following molar composition was obtained.

| | |
|---|---|
| $SiO_2/Al_2O_3 =$ | 3800 |
| $NPA/SiO_2 =$ | 0.25 |
| $OH/SiO_2 =$ | 0.12 |
| $Na/SiO_2 =$ | 0.12 |
| $H_2O/SiO_2 =$ | 10 |

To the above-described mixture, an MFI-type zeolite was added as seed crystals, and this was used as a raw material mixture. The amount of addition of the seed crystals was set to 0.5% by weight with respect to the weight of $SiO_2$ and $Al_2O_3$ in the mixture. The raw material mixture thus obtained was charged into a reaction vessel made of stainless steel, and this was hermetically sealed. Subsequently, this reaction vessel was heated up to 115° C. while revolving the reaction vessel at a rate of 55 rotations/minute. After heating, the mixture was crystallized by maintaining the reaction vessel at 115° C. for 36 hours while revolving the reaction vessel, and a crystallized slurry was obtained.

The crystallized slurry was cooled, filtered, washed with pure water, added to a 1.2 Normal aqueous solution of HCl, mixed, and washed with pure water so as to ion-exchange sodium in the pentasil-type zeolite with proton, subsequently the resulting zeolite was dried at 110° C., and thereby a pentasil-type zeolite was obtained.

The pentasil-type zeolite thus obtained was heat-treated for 2.5 hours at 75° C. in an aqueous solution of sodium hydroxide at pH 13, subsequently the pentasil-type zeolite was washed with pure water, added to a 1.2 Normal aqueous solution of HCl, mixed, and washed with pure water so as to ion-exchange sodium in the pentasil-type zeolite with proton, subsequently the resulting zeolite was dried at 110° C. and subjected to calcination for 2 hours at 720° C. under a flow of water vapor, and thus a pentasil-type zeolite was obtained.

The XRD pattern of the product coincided with the XRD pattern of the MFI structure, and it was verified that the product was a pentasil-type zeolite.

The water adsorption amount of the zeolite under the conditions of 25° C. and a relative humidity of 90% was 2.3 g/100 g-zeolite.

Figure 2:
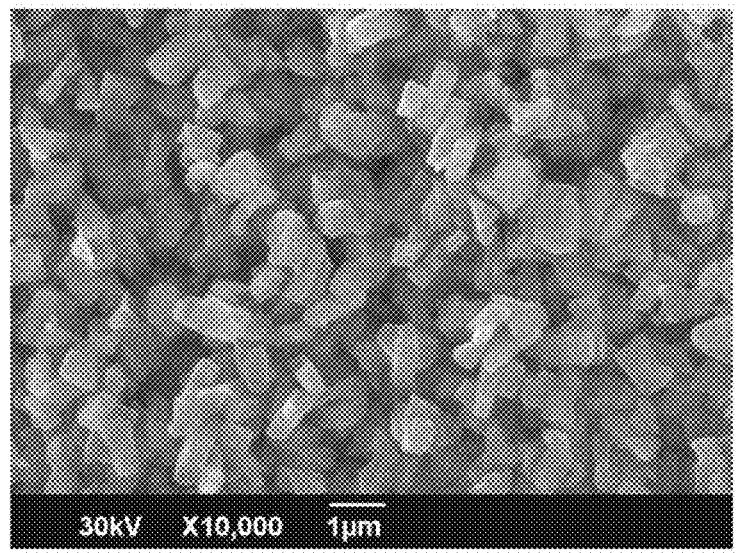
FIG. 2 is a SEM observation image of a pentasil-type zeolite of Example 1.

A SEM observation image of this zeolite is shown in FIG. 2. The major axis diameter of the primary particles measured from the SEM observation image was 1.0 μm, and the aspect ratio of the primary particles was 2.0. Furthermore, the shape of the primary particles was an angular shape (approximately rectangular parallelepiped shape).

Furthermore, the ratio $SiO_2/Al_2O_3$ (molar ratio) of this zeolite was 1900, the BET specific surface area was 373 m$^2$/g, and the content of $Na_2O$ was 0.01 percent by weight or less.

Example 2

A pentasil-type zeolite was obtained by a method similar to that of Example 1, except that the calcination temperature was set to 850° C.

The XRD pattern of the product coincided with the XRD pattern of the MFI structure, and it was verified that the product was a pentasil-type zeolite.

The water adsorption amount of this zeolite under the conditions of 25° C. and a relative humidity of 90% was 1.1 g/100 g-zeolite. The major axis diameter of the primary particles measured from a SEM observation image was 1.0 μm, and the aspect ratio of the primary particles was 2.0. Furthermore, the shape of the primary particles was an angular shape (approximately rectangular parallelepiped shape).

Furthermore, the ratio $SiO_2/Al_2O_3$ (molar ratio) of this zeolite was 1900, the BET specific surface area was 372 m$^2$/g, and the content of $Na_2O$ was 0.01 percent by weight or less.

Example 3

A pentasil-type zeolite was obtained by a method similar to that of Example 1, except that the calcination temperature was set to 650° C.

The XRD pattern of the product coincided with the XRD pattern of the MFI structure, and it was verified that the product was a pentasil-type zeolite.

The water adsorption amount of this zeolite under the conditions of 25° C. and a relative humidity of 90% was 2.8 g/100 g-zeolite. The major axis diameter of the primary particles measured from a SEM observation image was 1.0 μm, and the aspect ratio of the primary particles was 2.0. Furthermore, the shape of the primary particles was an angular shape (approximately rectangular parallelepiped shape).

Furthermore, the ratio $SiO_2/Al_2O_3$ (molar ratio) of this zeolite was 1900, the BET specific surface area was 386 m$^2$/g, and the content of $Na_2O$ was 0.01 percent by weight or less.

Example 4

By a method similar to that of Example 1, crystallization, filtration, and washing with pure water were carried out, the crystals were added to a 1.2 Normal aqueous solution of HCl, mixed, and washed with pure water so as to ion-exchange sodium in the pentasil-type zeolite with proton, subsequently the resulting zeolite was dried at 110° C., and thereby a pentasil-type zeolite was obtained.

The pentasil-type zeolite thus obtained was heat-treated for one hour at 60° C. in an aqueous solution of sodium hydroxide at pH 13, subsequently the pentasil-type zeolite was washed with pure water, added to a 1.2 Normal aqueous solution of HCl, mixed, and washed with pure water so as to ion-exchange sodium in the pentasil-type zeolite with proton, subsequently the resulting zeolite was dried at 110° C. and subjected to calcination for 2 hours at 780° C. under a flow of water vapor, and thus a pentasil-type zeolite was obtained.

The XRD pattern of the product coincided with the XRD pattern of the MFI structure, and it was verified that the product was a pentasil-type zeolite.

The water adsorption amount of this zeolite under the conditions of 25° C. and a relative humidity of 90% was 3.8 g/100 g-zeolite. The major axis diameter of the primary particles measured from a SEM observation image was 1.0 μm, and the aspect ratio of the primary particles was 2.0. Furthermore, the shape of the primary particles was an angular shape (approximately rectangular parallelepiped shape).

Furthermore, the ratio $SiO_2/Al_2O_3$ (molar ratio) of this zeolite was 1900, the BET specific surface area was 400 m$^2$/g, and the content of $Na_2O$ was 0.01 percent by weight or less.

Example 5

A pentasil-type zeolite was obtained by a method similar to that of Example 1, except that the molar composition of the mixture was set to $OH/SiO_2$=0.20 and $Na/SiO_2$=0.20; when sodium in the pentasil-type zeolite was ion-exchanged with proton by adding the zeolite after a heat treatment to a 1.2 Normal aqueous solution of HCl, mixing, and washing with pure water, 0.05 percent by weight of $Na_2O$ was caused to remain; and the calcination temperature was set to 680° C.

The XRD pattern of the product coincided with the XRD pattern of the MFI structure, and it was verified that the product was a pentasil-type zeolite.

The water adsorption amount of this zeolite under the conditions of 25° C. and a relative humidity of 90% was 2.1 g/100 g-zeolite. The major axis diameter of the primary particles measured from a SEM observation image was 0.8 μm, and the aspect ratio of the primary particles was 1.3. Furthermore, the shape of the primary particles was an angular shape (approximately cubic shape).

Furthermore, the ratio $SiO_2/Al_2O_3$ (molar ratio) of this zeolite was 1210, the BET specific surface area was 372 m$^2$/g, and the content of $Na_2O$ was 0.05 percent by weight.

Example 6

A pentasil-type zeolite was obtained by a method similar to that of Example 1, except that the molar composition of the mixture was set to $OH/SiO_2$=0.19 and $Na/SiO_2$=0.19; when sodium in the pentasil-type zeolite was ion-exchanged with proton by adding the zeolite after a heat treatment to a 1.2 Normal aqueous solution of HCl, mixing, and washing with pure water, 0.13 percent by weight of $Na_2O$ was caused to remain; and the calcination temperature was set to 600° C.

The XRD pattern of the product coincided with the XRD pattern of the MFI structure, and it was verified that the product was a pentasil-type zeolite.

The water adsorption amount of this zeolite under the conditions of 25° C. and a relative humidity of 90% was 2.5 g/100 g-zeolite. The major axis diameter of the primary particles measured from a SEM observation image was 0.8 μm, and the aspect ratio of the primary particles was 1.3.

Furthermore, the shape of the primary particles was an angular shape (approximately cubic shape).

Furthermore, the ratio $SiO_2/Al_2O_3$ (molar ratio) of this zeolite was 1690, the BET specific surface area was 368 $m^2/g$, and the content of $Na_2O$ was 0.13 percent by weight.

Example 7

A pentasil-type zeolite was obtained by a method similar to that of Example 1, except that the molar composition of the mixture was set to $OH/SiO_2=0.15$ and $Na/SiO_2=0.15$.

The XRD pattern of the product coincided with the XRD pattern of the MFI structure, and it was verified that the product was a pentasil-type zeolite.

The water adsorption amount of this zeolite under the conditions of 25° C. and a relative humidity of 90% was 2.2 g/100 g-zeolite. The major axis diameter of the primary particles measured from a SEM observation image was 0.9 µm, and the aspect ratio of the primary particles was 1.5. Furthermore, the shape of the primary particles was an angular shape (approximately cubic shape).

Furthermore, the ratio $SiO_2/Al_2O_3$ (molar ratio) of this zeolite was 1560, the BET specific surface area was 370 $m^2/g$, and the content of $Na_2O$ was 0.01 percent by weight or less.

Example 8

A pentasil-type zeolite was obtained by a method similar to that of Example 7, except that the amount of addition of the seed crystals was set to 0.05% by weight.

The XRD pattern of the product coincided with the XRD pattern of the MFI structure, and it was verified that the product was a pentasil-type zeolite.

The water adsorption amount of this zeolite under the conditions of 25° C. and a relative humidity of 90% was 2.1 g/100 g-zeolite. The major axis diameter of the primary particles measured from a SEM observation image was 2.2 µm, and the aspect ratio of the primary particles was 1.8. Furthermore, the shape of the primary particles was an angular shape (approximately rectangular parallelepiped shape).

Furthermore, the ratio $SiO_2/Al_2O_3$ (molar ratio) of this zeolite was 1600, the BET specific surface area was 365 $m^2/g$, and the content of $Na_2O$ was 0.01 percent by weight or less.

Example 9

A pentasil-type zeolite was obtained by a method similar to that of Example 1, except that the molar composition of the mixture was set to $OH/SiO_2=0.20$ and $Na/SiO_2=0.20$, the amount of addition of the seed crystals was set to 3.0% by weight, the crystallization temperature was set to 105° C., and the crystallization time was set to 72 hours.

The XRD pattern of the product coincided with the XRD pattern of the MFI structure, and it was verified that the product was a pentasil-type zeolite.

The water adsorption amount of this zeolite under the conditions of 25° C. and a relative humidity of 90% was 2.4 g/100 g-zeolite. The major axis diameter of the primary particles measured from a SEM observation image was 0.4 µm, and the aspect ratio of the primary particles was 1.2. Furthermore, the shape of the primary particles was an angular shape (approximately cubic shape).

Furthermore, the ratio $SiO_2/Al_2O_3$ (molar ratio) of this zeolite was 1100, the BET specific surface area was 385 $m^2/g$, and the content of $Na_2O$ was 0.01 percent by weight or less.

Comparative Example 1

Figure 3:
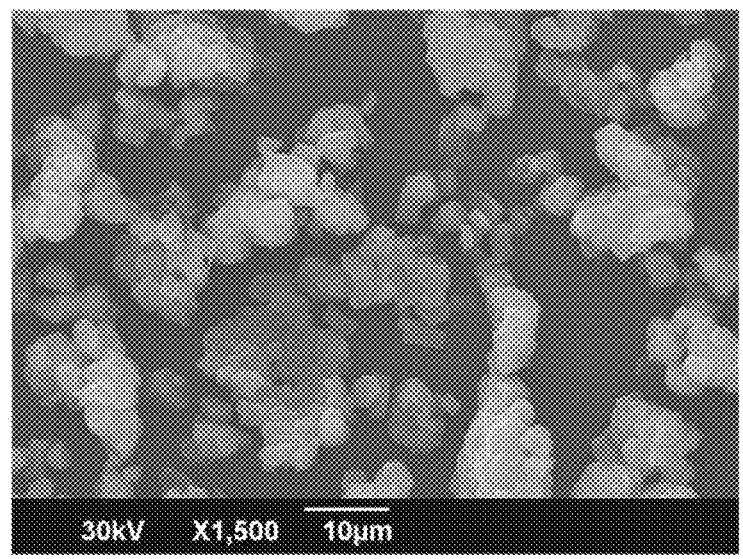
FIG. 3 is a SEM observation image of an MFI-type zeolite (trade name: HSZ (registered trademark)-840HOA, manufactured by Tosoh Corporation).

Measurement of the water adsorption amount of an MFI-type zeolite (trade name: HSZ (registered trademark)-840HOA, manufactured by Tosoh Corporation) and measurement of the major axis diameter of primary particles by SEM observation were carried out. The water adsorption amount under the conditions of 25° C. and a relative humidity of 90% was 11.6 g/100 g-zeolite. A SEM observation image is shown in FIG. 3. The major axis diameter of the primary particles was 4.0 µm, and the aspect ratio of the primary particles was 1.9. Furthermore, the shape of the primary particles was an angular shape (approximately rectangular parallelepiped shape).

Furthermore, the ratio $SiO_2/Al_2O_3$ molar ratio of this zeolite was 38, the BET specific surface area was 330 $m^2/g$, and the content of $Na_2O$ was 0.01 percent by weight or less.

Comparative Example 2

Figure 4:
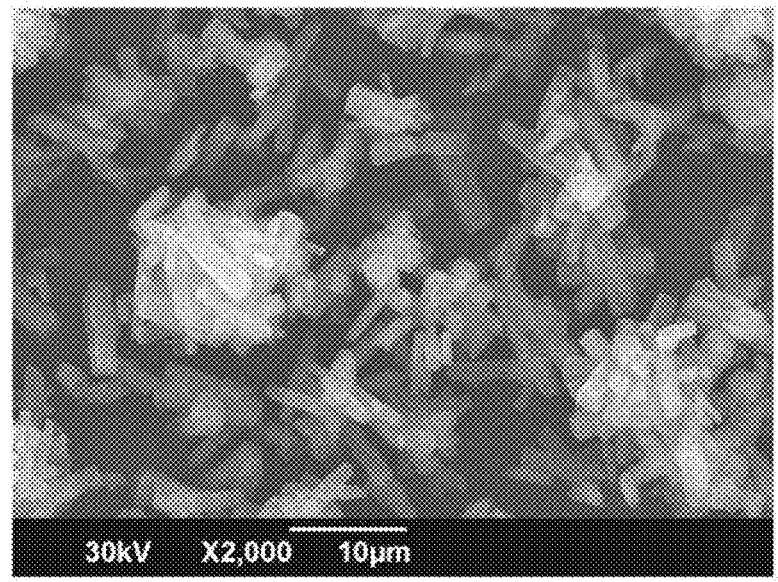
FIG. 4 is a SEM observation image of an MFI-type zeolite (trade name: HSZ (registered trademark)-890HOA, manufactured by Tosoh Corporation).

Measurement of the water adsorption amount of an MFI-type zeolite (trade name: HSZ (registered trademark)-890HOA, manufactured by Tosoh Corporation) and measurement of the major axis diameter of primary particles by SEM observation were carried out. The water adsorption amount under the conditions of 25° C. and a relative humidity of 90% was 6.6 g/100 g-zeolite. A SEM observation image is shown in FIG. 4. The major axis diameter of the primary particles was 6.1 µm, and the aspect ratio of the primary particles was 4.0. Furthermore, the shape of the primary particles was an angular shape (approximately rectangular parallelepiped shape).

Furthermore, the ratio $SiO_2/Al_2O_3$ molar ratio of this zeolite was 1900, the BET specific surface area was 300 $m^2/g$, and the content of $Na_2O$ was 0.01 percent by weight or less.

Comparative Example 3

By a method similar to that of Example 1, crystallization, filtration, and washing with pure water were carried out, the crystals were added to a 1.2 Normal aqueous solution of HCl, mixed, and washed with pure water so as to ion-exchange sodium in the pentasil-type zeolite with proton, subsequently the resulting zeolite was dried at 110° C., and thereby a pentasil-type zeolite was obtained (the step of bringing the zeolite into contact with an alkali solution at pH 10 to 14 and the step of calcining the zeolite under a flow of water vapor were not carried out).

The XRD pattern of the product coincided with the XRD pattern of the MFI structure, and it was verified that the product was a pentasil-type zeolite.

The water adsorption amount of this zeolite under the conditions of 25° C. and a relative humidity of 90% was 8.1 g/100 g-zeolite. The major axis diameter of the primary particles measured from a SEM observation image was 1.0 µm, and the aspect ratio of the primary particles was 2.0. Furthermore, the shape of the primary particles was an angular shape (approximately rectangular parallelepiped shape).

Furthermore, the ratio $SiO_2/Al_2O_3$ (molar ratio) of this zeolite was 1900, the BET specific surface area was 379 $m^2/g$, and the content of $Na_2O$ was 0.01 percent by weight or less.

Comparative Example 4

By a method similar to that of Example 1, crystallization, filtration, and washing with pure water were carried out, the crystals were added to a 1.2 Normal aqueous solution of HCl, mixed, and washed with pure water so as to ion-exchange sodium in the pentasil-type zeolite with proton, subsequently the resulting zeolite was dried at 110° C., and thereby a pentasil-type zeolite was obtained.

The pentasil-type zeolite thus obtained was heat-treated for 2.5 hours at 75° C. in an aqueous solution of sodium hydroxide at pH 13, subsequently the pentasil-type zeolite was washed with pure water, added to a 1.2 Normal aqueous solution of HCl, mixed, and washed with pure water so as to ion-exchange sodium in the pentasil-type zeolite with proton, subsequently the resulting zeolite was dried at 110° C., and thereby a pentasil-type zeolite was obtained (the step of calcining the zeolite under a flow of water vapor was not carried out).

The XRD pattern of the product coincided with the XRD pattern of the MFI structure, and it was verified that the product was a pentasil-type zeolite.

The water adsorption amount of this zeolite under the conditions of 25° C. and a relative humidity of 90% was 4.4 g/100 g-zeolite. The major axis diameter of the primary particles measured from a SEM observation image was 1.0 μm, and the aspect ratio of the primary particles was 2.0. Furthermore, the shape of the primary particles was an angular shape (approximately rectangular parallelepiped shape).

Furthermore, the ratio $SiO_2/Al_2O_3$ (molar ratio) of this zeolite was 1900, the BET specific surface area was 411 $m^2/g$, and the content of $Na_2O$ was 0.01 percent by weight or less.

Comparative Example 5

By a method similar to that of Example 1, crystallization, filtration, and washing with pure water were carried out, the crystals were added to a 1.2 Normal aqueous solution of HCl, mixed, and washed with pure water so as to ion-exchange sodium in the pentasil-type zeolite with proton, subsequently the resulting zeolite was dried at 110° C. and subjected to calcination for 2 hours at 720° C. under a flow of water vapor, and thus a pentasil-type zeolite was obtained (the step of bringing the zeolite into contact with an alkali solution at pH 10 to 14 was not carried out).

The XRD pattern of the product coincided with the XRD pattern of the MFI structure, and it was verified that the product was a pentasil-type zeolite.

The water adsorption amount of this zeolite under the conditions of 25° C. and a relative humidity of 90% was 6.2 g/100 g-zeolite. The major axis diameter of the primary particles measured from a SEM observation image was 1.0 μm, and the aspect ratio of the primary particles was 2.0. Furthermore, the shape of the primary particles was an angular shape (approximately rectangular parallelepiped shape).

Furthermore, the ratio $SiO_2/Al_2O_3$ (molar ratio) of this zeolite was 1900, the BET specific surface area was 410 $m^2/g$, and the content of $Na_2O$ was 0.01 percent by weight or less.

Comparative Example 6

An aqueous solution of sodium silicate and sulfuric acid were mixed, and particulate amorphous silicic acid was obtained. The particulate amorphous silicic acid thus obtained, an aqueous solution of tetrapropylammonium bromide, sodium hydroxide, and pure water were mixed, and a mixture having the following molar composition was obtained ($TPA^+$ represents tetrapropylammonium cation).

| | |
|---|---|
| $SiO_2/Al_2O_3 =$ | 3800 |
| $TPA^+/SiO_2 =$ | 0.05 |
| $OH/SiO_2 =$ | 0.17 |
| $Na/SiO_2 =$ | 0.17 |
| $H_2O/SiO_2 =$ | 10 |

Crystallization was performed by a method similar to that of Example 1, except that the above-described mixture was used, and the crystallization temperature was set to 135° C., and a crystallized slurry was obtained.

The crystallized slurry was cooled, filtered, washed, and dried at 110° C., the dried residue was calcined at 580° C. in air, added to a 1 Normal aqueous solution of HCl, mixed, and washed with pure water so as to ion-exchange sodium in the pentasil-type zeolite with proton, subsequently the resulting zeolite was dried at 110° C., and thereby a pentasil-type zeolite was obtained.

The pentasil-type zeolite thus obtained was heat-treated for one hour at 60° C. in an aqueous solution of sodium hydroxide at pH 13, subsequently the pentasil-type zeolite was washed with pure water, added to a 1.2 Normal aqueous solution of HCl, mixed, and washed with pure water so as to ion-exchange sodium in the pentasil-type zeolite with proton, subsequently the resulting zeolite was dried at 110° C. and subjected to calcination for 2 hours at 780° C. under a flow of water vapor, and thus a pentasil-type zeolite was obtained.

The XRD pattern of the product coincided with the XRD pattern of the MFI structure, and it was verified that the product was a pentasil-type zeolite.

The water adsorption amount of this zeolite under the conditions of 25° C. and a relative humidity of 90% was 6.2 g/100 g-zeolite.

Figure 5:
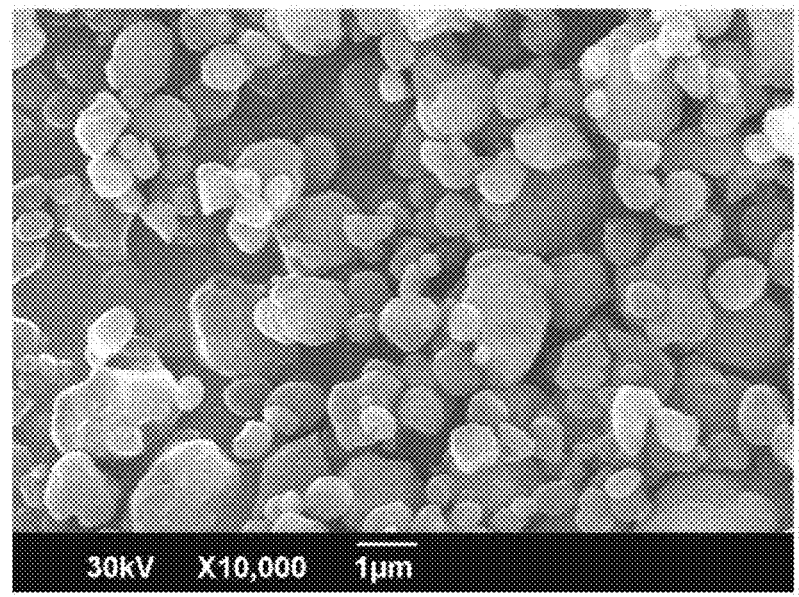
FIG. 5 is a SEM observation image of a pentasil-type zeolite of Comparative Example 6.

A SEM observation image of this zeolite is shown in FIG. 5. The major axis diameter of primary particles measured from the SEM observation image was 0.83 μm, and the aspect ratio of the primary particles was 1.3. Furthermore, the shape of the primary particles was an approximately spherical shape.

Furthermore, the ratio $SiO_2/Al_2O_3$ (molar ratio) of this zeolite was 1900, the BET specific surface area was 406 $m^2/g$, and the content of $Na_2O$ was 0.01 percent by weight or less.

<Toluene Adsorption Amount>

The adsorption amount of toluene, which is one of representative components of VOC, was evaluated using the pentasil-type zeolites obtained in Examples 1 and 5 and Comparative Examples 2 and 3.

For the measurement of the adsorption amount of toluene, a vapor adsorption amount measuring apparatus (trade name: BELSORP-max II, manufactured by MicrotracBEL Corp.) was used. Measurement was carried out at 25° C. As a pretreatment, a sample was maintained at 350° C. for 2 hours. For the sample after the pretreatment, measurement of the adsorption amount of toluene was carried out, and the toluene adsorption amount per 100 g of zeolite (hereinafter, referred to as "g/100 g-zeolite") at an equilibrium pressure of 0.01 kPa was measured. Furthermore, the adsorption selection ratio of toluene/water was calculated by the formula: toluene adsorption amount per 100 g of zeolite at an equilibrium pressure of 0.01 kPa/water adsorption amount per 100 g of zeolite at a relative humidity of 90%. The results are presented in Table 1.

TABLE 1

|  | Toluene adsorption amount | Adsorption selection ratio of toluene/water |
|---|---|---|
| Example 1 | 5.8 | 2.5 |
| Example 5 | 5.8 | 2.8 |
| Comparative Example 2 | 6.8 | 1.0 |
| Comparative Example 3 | 7.0 | 0.9 |

Unit of Adsorption Amount: g/100 g-Zeolite

As is obvious from Table 1, the pentasil-type zeolites of Examples exhibited high adsorption selection ratios of toluene/water. It can be said that the pentasil-type zeolite of the present invention is appropriate for a VOC adsorbent.

Incidentally, the entire disclosures of the specifications, claims, drawings, and abstracts of Japanese Patent Application No. 2018-200724 filed on Oct. 25, 2018, and Japanese Patent Application No. 2019-133651 filed on Jul. 19, 2019 are cited herein by reference and are introduced as disclosure of the specification of the present invention.

INDUSTRIAL APPLICABILITY

The pentasil-type zeolite of the present invention can be used as an adsorbent or a catalyst. Particularly, the pentasil-type zeolite is appropriate for a VOC adsorbent as the adsorbent, and for a petrochemical and petroleum refining catalyst as the catalyst.

REFERENCE SIGNS LIST

1: one primary particle left to stand on flat surface, 2: contour of projected image of 1 when observed in direction perpendicular to flat surface, 3: two parallel lines in contact with 2, 4: length where parallel lines upon being interposed by 3 is largest (major axis diameter of primary particles), 5: length where parallel lines upon being interposed by 3 is smallest (minor axis diameter of primary particles).

The invention claimed is:

1. A pentasil-type zeolite having a water adsorption amount of 4.0 g/100 g-zeolite or less under the conditions of 25° C. and a relative humidity of 90% and having a major axis diameter of primary particles of from 0.2 μm to 4.0 μm.

2. The pentasil-type zeolite according to claim 1, wherein the pentasil-type zeolite has an aspect ratio of primary particles of from 1.0 to 3.0.

3. The pentasil-type zeolite according to claim 1, wherein the pentasil-type zeolite has a ratio $SiO_2/Al_2O_3$ (molar ratio) of 200 or higher.

4. The pentasil-type zeolite according to claim 1, wherein the pentasil-type zeolite has a BET specific surface area of 300 m²/g or larger.

5. The pentasil-type zeolite according to claim 1, wherein the pentasil-type zeolite has a content of $Na_2O$ of 1.00 percent by weight or less.

6. A method for producing the pentasil-type zeolite according to claim 1, comprising:
   crystallizing a mixture including a silicon source, an amine as a structure-directing agent, and an alkali source, the mixture including no fluorine source, to form a zeolite;
   bringing the zeolite into contact with an alkali solution at pH 10 to 14; and
   calcining the zeolite at a temperature of 500° C. to 1000° C. under a flow of water vapor.

7. The method for producing the pentasil-type zeolite according to claim 6, wherein the amine is n-propylamine, dipropylamine, or tripropylamine.

8. The method for producing the pentasil-type zeolite according to claim 6, wherein the crystallization temperature is 160° C. or lower.

9. The method for producing the pentasil-type zeolite according to claim 6, wherein the mixture has the following molar composition:

| Structure-directing agent/$SiO_2$ | from 0.04 to 0.5 |
|---|---|
| $OH^-/SiO_2$ | from 0.08 to 0.2. |

* * * * *